(12) United States Patent
Ahn et al.

(10) Patent No.: US 9,099,696 B2
(45) Date of Patent: Aug. 4, 2015

(54) SECONDARY BATTERY

(75) Inventors: Changbum Ahn, Yongin (KR); Jakyung Cho, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 722 days.

(21) Appl. No.: 12/916,449

(22) Filed: Oct. 29, 2010

(65) Prior Publication Data
US 2011/0117404 A1 May 19, 2011

(30) Foreign Application Priority Data
Nov. 16, 2009 (KR) .................. 10-2009-0110519

(51) Int. Cl.
*H01M 2/02* (2006.01)
*H01M 2/04* (2006.01)
*H01M 10/0525* (2010.01)

(52) U.S. Cl.
CPC .......... *H01M 2/0404* (2013.01); *H01M 2/0207* (2013.01); *H01M 2/0212* (2013.01); *H01M 2/0482* (2013.01); *H01M 2/022* (2013.01); *H01M 10/0525* (2013.01); *Y02E 60/122* (2013.01)

(58) Field of Classification Search
CPC ... H01M 2/0417; H01M 2/04; H01M 2/0404; H01M 2/021; H01M 2/0212
USPC ............................. 429/181, 175, 94
See application file for complete search history.

(56) References Cited

U.S. PATENT DOCUMENTS

| | | | |
|---|---|---|---|
| 6,083,640 A * | 7/2000 | Lee et al. .................. | 429/94 |
| 6,146,785 A * | 11/2000 | Rigobert et al. .......... | 429/94 |
| 7,682,735 B2 * | 3/2010 | Lee .......................... | 429/176 |
| 2006/0099501 A1 | 5/2006 | Kim et al. | |
| 2006/0216591 A1 | 9/2006 | Lee | |
| 2007/0128513 A1 | 6/2007 | Hatta et al. | |
| 2007/0154794 A1 | 7/2007 | Kim et al. | |
| 2007/0196732 A1 * | 8/2007 | Tatebayashi et al. ......... | 429/181 |
| 2007/0287063 A1 * | 12/2007 | Hiratsuka et al. ............. | 429/177 |
| 2009/0098417 A1 | 4/2009 | Yamada et al. | |

(Continued)

FOREIGN PATENT DOCUMENTS

| CN | 1992381 A | 7/2007 |
|---|---|---|
| EP | 1-006-602 A1 | 6/2000 |

(Continued)

OTHER PUBLICATIONS

Japanese Patent Office action dated Jul. 31, 2012 corresponding to JP 2010-128961 (2 pages).

(Continued)

*Primary Examiner* — Maria J Laios
(74) *Attorney, Agent, or Firm* — Christie, Parker & Hale, LLP

(57) ABSTRACT

A secondary battery includes an electrode assembly having a first electrode plate, a second electrode plate, and a separator between the first electrode plate and the second electrode plate; a first electrode terminal electrically coupled to the first electrode plate and a second electrode terminal electrically coupled to the second electrode plate; an external member wrapped around side surfaces of the electrode assembly; and a first cover and a second cover coupled to the external member and covering a first end surface and a second end surface, respectively, of the electrode assembly, wherein the first electrode terminal and the second electrode terminal protrude from at least one of the first cover or the second cover.

18 Claims, 5 Drawing Sheets

(56) References Cited

U.S. PATENT DOCUMENTS

| | | | |
|---|---|---|---|
| 2009/0117412 A1* | 5/2009 | Koh et al. | ............ 429/7 |
| 2009/0162748 A1 | 6/2009 | Fan et al. | |
| 2010/0196745 A1 | 8/2010 | Ahn et al. | |

FOREIGN PATENT DOCUMENTS

| | | |
|---|---|---|
| EP | 1-708-295 A2 | 10/2006 |
| EP | 1-744-384 A1 | 1/2007 |
| JP | 2000-100466 A | 4/2000 |
| JP | 2004-303535 | 10/2004 |
| JP | 2005-142416 | 6/2005 |
| JP | 2006-128126 | 5/2006 |
| JP | 2006-278331 | 10/2006 |
| JP | 2007-227090 A | 9/2007 |
| KR | 10-2000-0020533 | 4/2000 |
| KR | 10-2004-0005022 | 1/2004 |
| KR | 10-2007-0058351 | 6/2007 |
| KR | 10-2009-0038367 | 4/2009 |
| KR | 10-2010-0090141 | 8/2010 |

OTHER PUBLICATIONS

KIPO Office Action dated Jul. 28, 2011, for Korean priority Patent application 10-2009-0110519, noting the listed references in this IDS, 7 pages.

KIPO Office Action dated May 1, 2012 in priority Korean patent application No. 10-2009-0110519 (2 pages).

Patent Abstracts of Japan for JP2004-303535 and Machine English Translation.

Extended European Search Report dated Mar. 11, 2011 issued by the European Patent Office in the European patent application corresponding to the priority KR application No. 10-2009-0110519, listing the cited references in this IDS.

Chinese Office action dated Feb. 5, 2013 cited in corresponding Chinese Application No. 2010-10549700.8 with English translation, 15 pages.

Japanese Office action dated Jun. 4, 2013 issued to corresponding Japanese application No. 2010-128961, 3 pages.

* cited by examiner

SECONDARY BATTERY

CROSS-REFERENCE TO RELATED APPLICATION

This application claims priority to and the benefit of Korean Patent Application No. 10-2009-0110519, filed on Nov. 16, 2009, the entire content of which is incorporated herein by reference.

BACKGROUND

1. Field of the Invention

Embodiments relate to a secondary battery, and more particularly, to a secondary battery.

2. Description of the Related Art

In general, a secondary battery is assembled by storing an electrode assembly and electrolyte in an external case. Typically, the electrode assembly includes a positive electrode plate, a negative electrode plate, and a separator disposed between the electrode plates.

Specifically, a high capacity battery often includes a stack type or wound type electrode assembly that has a plurality of unit batteries and a plurality of separators.

Such a high capacity battery may require an additional sealing space in an external case storing an electrode assembly, thus decreasing the capacity of the battery.

Furthermore, it may be difficult to seal the space between the external case and electrode terminals extending to the outside for delivering a current of the electrode assembly to the outside.

SUMMARY

According to one aspect of the present invention, a secondary battery is provided that omits an additional sealing space of an external case storing an electrode assembly to increase the capacity of the battery.

According to another aspect of the present invention, a secondary battery is provided that improves a sealing performance between an electrode terminal of an electrode assembly and an external case to improve the reliability of the battery.

In one embodiment, a secondary battery is provided including an electrode assembly having a first electrode plate, a second electrode plate, and a separator between the first electrode plate and the second electrode plate; a first electrode terminal electrically coupled to the first electrode plate and a second electrode terminal electrically coupled to the second electrode plate; an external member wrapped around side surfaces of the electrode assembly; and a first cover and a second cover coupled to the external member and covering a first end surface and a second end surface, respectively, of the electrode assembly, wherein the first electrode terminal and the second electrode terminal protrude from one of the first cover or the second cover.

In one embodiment, the first electrode terminal protrudes from the first cover and the second electrode terminal protrudes from the second cover. In another embodiment, the first electrode terminal and the second electrode terminal protrude from the first cover. Further, the external member may have a first surface overlapping and welded to a second surface of the external member to form a sealing part.

In one embodiment, the first cover and the second cover are welded to the external member, such as by heat welding. Further, the external member may include a gas chamber to which gas generated during charging and discharging of the secondary battery is discharged, and wherein the gas chamber is configured to inject electrolyte into the secondary battery.

BRIEF DESCRIPTION OF THE DRAWINGS

The above and other features and aspects will become more apparent to those of ordinary skill in the art based on the following detailed description of exemplary embodiments with reference to the attached drawings, in which.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
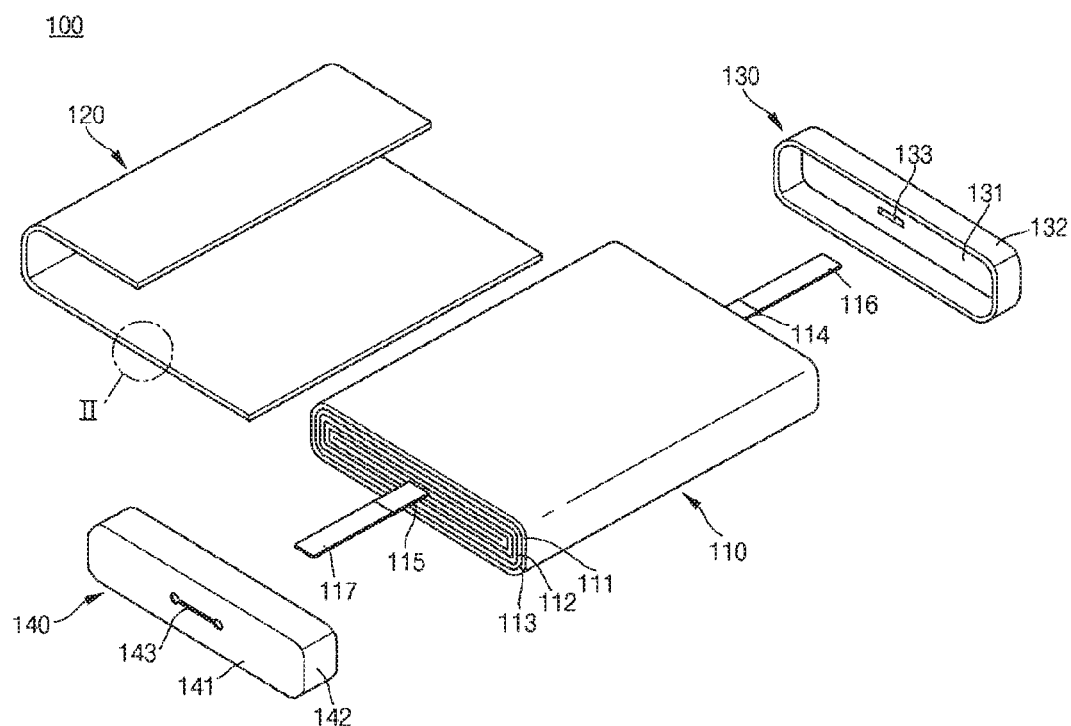
FIG. 1 is an exploded perspective view illustrating a secondary battery according to an embodiment.
Figure 2:
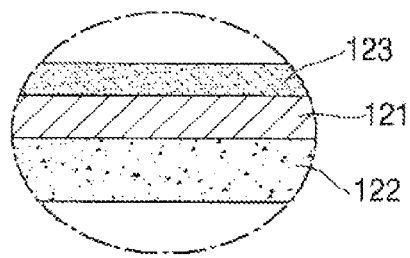
FIG. 2 is an enlarged view illustrating portion II of FIG. 1.
Figure 3:
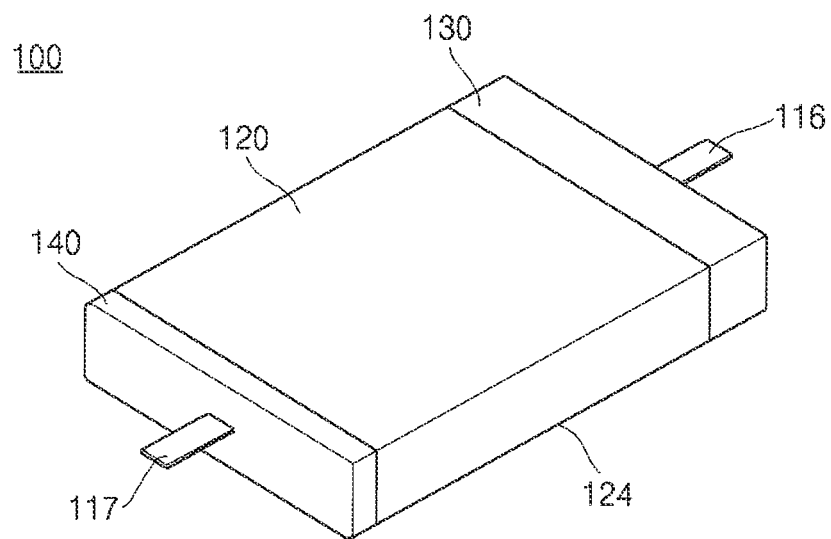
FIG. 3 is a perspective view illustrating an assembled secondary battery of FIG. 1.
Figure 4:
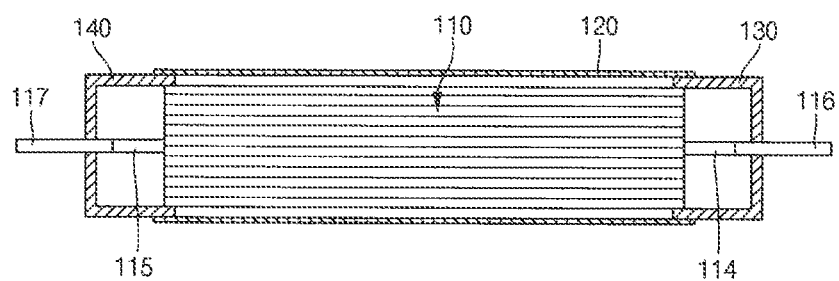
FIG. 4 is a cross-sectional view of FIG. 3.
Figure 5:
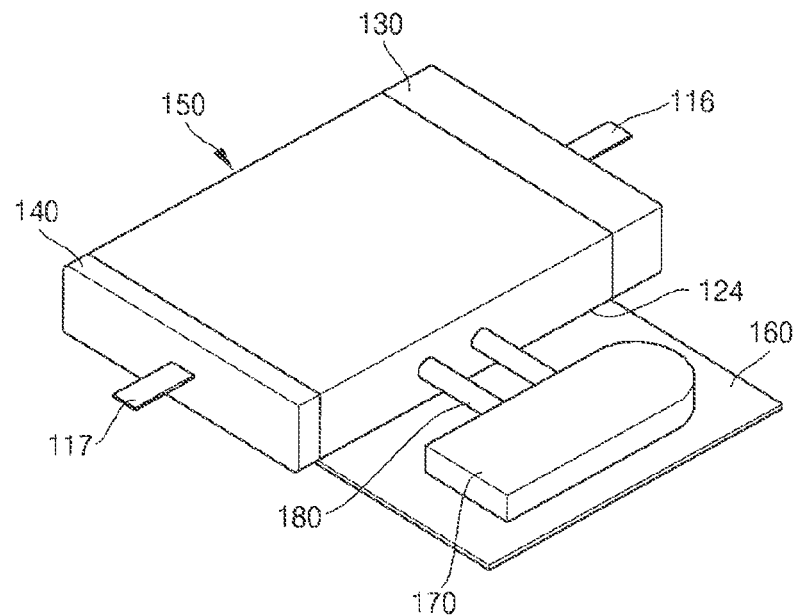
FIG. 5 is a perspective view illustrating the secondary battery of FIG. 1 including a gas chamber.

FIG. 1 is an exploded perspective view illustrating a secondary battery according to an embodiment. FIG. 2 is an enlarged view illustrating a portion II of FIG. 1. FIG. 3 is a perspective view illustrating an assembled secondary battery of FIG. 1. FIG. 4 is a cross-sectional view of FIG. 3. FIG. 5 is a perspective view illustrating the secondary battery including a gas chamber.

Referring to FIGS. 1 through 5, a secondary battery 100 includes: an electrode assembly 110 including a first electrode plate 111 and a second electrode plate 112 to which electrode tabs 114 and 115 having different polarities to deliver a current to the outside are respectively attached, and a separator 113 disposed between the first and second electrode plates 111 and 112; an external member 120 surrounding the electrode assembly 110; and first and second covers 130 and 140 welded to respective ends of the external member 120. The electrode assembly 110 is formed by sequentially stacking and winding the first electrode plate 111, the separator 113, and the second electrode plate 112. A first electrode terminal 116 connected to the electrode tab 114 extends to the outside through the first cover 130, and a second electrode terminal 117 connected to the electrode tab 115 extends to the outside through the second cover 140. In one embodiment, the secondary battery 100 may be a lithium polymer secondary battery.

In the current embodiment, the first electrode plate 111 of the electrode assembly 110 may be a positive electrode plate, and the second electrode plate 112 may be a negative electrode plate. However, the polarity of the electrode plates 111, 112 may be reversed.

The positive electrode plate 111 includes a positive electrode collector and a positive electrode coated portion disposed on the positive electrode collector. An end of the positive electrode collector has a positive electrode uncoated portion. The electrode tab 114, which is electrode tab of the first electrode plate 111, are attached to the positive electrode uncoated portion. Thus, the electrode tab 114 is electrically coupled to an external circuit such that electrons collected in the positive electrode collector flow to the external circuit. The positive electrode collector and the electrode tab 114 are formed of aluminum (Al) that has high electrical conductivity. The electrode tab 114 may be attached to the positive electrode uncoated portion through supersonic welding. The positive electrode coated portion is formed by mixing lithium metal oxide such as lithium cobalt oxide ($LiCoO_2$) with conductive material and a binder for inserting and extracting lithium ions. After the electrode tab 114 is welded to the positive electrode uncoated portion, a tape is attached to the electrode tab 114 to prevent detachment of the electrode tab 114.

The negative electrode plate 112 includes a negative electrode collector collecting electrons generated through a chemical reaction, and a negative electrode coated portion disposed on the upper portion of the negative electrode collector. An end of the negative electrode collector is provided with a negative electrode uncoated portion. The electrode tab 115, which is electrode tab of the second electrode plate 112, is attached to the negative electrode uncoated portion. Thus, the electrode tab 114 is electrically coupled to an external circuit such that electrons collected in the negative electrode collector flow to the external circuit. A tape is attached to the electrode tab 115 to prevent the electrode tab 115 from being detached from the negative electrode uncoated portion. The negative electrode collector may be formed of copper (Cu) or nickel (Ni) that has high electrical conductivity. The electrode tab 115 may be formed of nickel (Ni). The negative electrode coated portion is formed by mixing carbon material with conductive material and a binder for inserting and extracting lithium ions.

The positive electrode tab 114 attached to the positive electrode plate 111 extends in a first direction of the electrode assembly 110. The negative electrode tab 115 attached to the negative electrode plate 112 extends in a second direction that is generally opposite to the first direction of the electrode assembly 110. Thus, the positive electrode tab 114 and the negative electrode tab 115 extend in opposite directions with respect to the electrode assembly 110. The first electrode terminal 116 is welded to the positive electrode tab 114. The second electrode terminal 117 is welded to the negative electrode tab 115.

The external member 120 surrounds side surfaces of the wound electrode assembly 110. The wound electrode assembly 110 is compressed on both sides to have a substantially rectangular parallelepiped shape. In this case, the external member 120 surrounds four side surfaces of the electrode assembly 110, but not the top and bottom end surfaces from which the positive electrode tab 114 and the negative electrode tab 115 extend.

The electrode assembly 110 and electrolyte are stored inside the external member 120. Two sides of the external member 120 are welded together, e.g., through heat welding at both ends to form a sealing part 124. A side of the sealing part 124 may be provided with a gas chamber through which the electrolyte is injected and gas generated during charging/discharging is discharged. A structure of the gas chamber will be described in more detail in a description of a fabrication method to be described later.

The external member 120 may include a laminate film with an substantially rectangular shape. The laminate film has a thickness ranging from about 170 μm to about 300 μm, and prevents leakage of an electrode assembly and electrolyte and may have high strength with high shock resistance property. Thus, when the thickness of the laminate film is less than 170 μm, it is difficult to secure sufficient shock resistance. When the thickness of the laminate film is greater than 300 μm, it is difficult to increase the capacity of a battery relative to a metal can type external member.

The external member 120 includes a shield layer 121, an outer layer 122 disposed on a first surface of the shield layer 121, and an inner layer 123 disposed on a second surface of the shield layer 121.

The shield layer 121 may be formed of metal that may be at least one of iron (Fe), nickel (Ni), and aluminum (Al). The metal of the shield layer 121 has high mechanical strength and high corrosion resistance. Thus, mechanical strength of the external member 120, and corrosion resistance of the external member 120 against electrolyte are improved. The metal of the shield layer 121 may have an elongation ranging from about 20% to about 60%. Accordingly, the shield layer 121 may have a thickness ranging from about 20 μm to about 150 μm.

The outer layer 122 is disposed on the outer surface of the external member 120, and may be one of nylon and polyethylene terephthalate (PET) having high tensile strength, high shock strength, and high durability. The outer layer 122 may be formed on the outer surface of the shield layer 121 at high temperature in a laminate manner. The outer layer 122 may have a thickness ranging from about 5 μm to about 30 μm. Polyethylene terephthalate (PET) may constitute an alloy film. An adhesive component does not need to be included in polyethylene terephthalate (PET). In this case, adhesive is applied on a surface of the shield layer 121, and then polyethylene terephthalate (PET) is attached to the surface.

The inner layer 123 is disposed on the inner surface of the external member 120. The inner layer 123 may be formed of modified polypropylene (CPP). The inner layer 123 may have a thickness ranging from about 30 μm to about 150 μm.

The first cover 130 is coupled to a position where the first electrode terminal 116 welded to the positive electrode tab 114 attached to the positive electrode plate 111 extends in the first direction of the electrode assembly 110.

The first cover 130 has an substantially rectangular parallelepiped shape with an open surface, and a size corresponding to the electrode assembly 110. That is, the first cover 130 has a cap shape having an inner surface with an open surface, thereby defining a cavity. The first cover 130 includes a flat plate 131 and a side plate 132 attached to the flat plate 131.

The flat plate 131 of the first cover 130 is provided with a terminal hole or opening 133 through which the first electrode terminal 116 passes. An edge of the first electrode terminal 116 is welded and fixed to the inner portion of the terminal opening 133 of the first cover 130. Sealing material is injected or applied between the first electrode terminal 116 and the inner surface of the terminal opening 133 to prevent leakage of electrolyte. The positive electrode tab 114 is bent in the first cover 130 to maximally secure the inner space of the external member 120, thus increasing the capacity of the battery.

The first cover 130 may be formed of one of polypropylene (PP) and polyethylene (PE), but the present disclosure is not limited thereto.

The second cover 140 is coupled to a position where the second electrode terminal 117 welded to the negative electrode tab 115 attached to the negative electrode plate 112 extends in the second direction of the electrode assembly 110.

The second cover 140 has a substantially rectangular parallelepiped cap shape with an open surface defining a cavity, and a size corresponding to the electrode assembly 110. The second cover 140 includes a flat plate 141 and a side plate 142 attached to the flat plate 141. Alternatively, the second cover 140 may have a plate shape. The flat plate 141 of the second cover 140 is provided with a terminal hole or opening 143 through which the second electrode terminal 117 passes. An edge of the second electrode terminal 117 is welded and fixed to the inner portion of the terminal opening 143 of the second cover 140. Sealing material is injected or applied between the second electrode terminal 117 and the inner surface of the terminal opening 143 to substantially prevent leakage of electrolyte.

The second cover 140 may be formed of one of polypropylene (PP) and polyethylene (PE), but the present disclosure is not limited thereto.

A method of fabricating the secondary battery configured as described above will now be described.

The positive electrode plate 111, the separator 113, and the second electrode plate 112 are sequentially stacked and wound to form the electrode assembly 110 in generally a jelly roll shape. Then, the positive electrode tab 114 is attached to the uncoated portion of the positive electrode plate 111, and the negative electrode tab 115 is attached to the uncoated portion of the negative electrode plate 112. In one embodiment, the direction in which the positive electrode tab 114 attached to the positive electrode plate 111 extends out of the electrode assembly 110 is opposite to the direction in which the negative electrode tab 115 attached to the negative electrode plate 112 extends out of the electrode assembly 110. The electrode assembly 110 having a jelly roll shape is compressed from both side surfaces with a jig so as to form a relatively thin electrode assembly with a substantially rectangular parallelepiped shape. The first electrode terminal 116 welded to the positive electrode tab 114 of the electrode assembly 110 protrudes in the first direction from the electrode assembly 110. The second electrode terminal 117 welded to the negative electrode tab 115 of the electrode assembly 110 protrudes in a second direction of the electrode assembly 110, generally toward a lower side of the electrode assembly 110 and substantially opposite to the first direction.

The upper end of the electrode assembly 110 is coupled with the first cover 130. The first electrode terminal 116 protrudes out of the first cover 130 through the terminal opening 133 of the first cover 130. The first electrode terminal 116 is fixed to the terminal opening 133 of the first cover 130 through a process such as welding. The lower end of the electrode assembly 110 is coupled with the second cover 140. The second electrode terminal 117 protrudes out of the second cover 140 through the terminal opening 143 of the second cover 140. The second electrode terminal 117 is fixed to the terminal opening 143 of the second cover 140 through a process such as welding. Sealing material may be applied on a welded portion between the terminal opening 133 of the first cover 130 and the first electrode terminal 116, and on a welded portion between the terminal opening 143 of the second cover 140 and the second electrode terminal 117.

Then, the external member 120 is placed around the electrode assembly 110 to wrap or surround the side surfaces of the electrode assembly 110 and the side surfaces of the first and second covers 130 and 140, and two edges of the external member 120 overlap each other to be thermally compressed, that is, they overlap to allow two side surfaces to be welded by heat welding to form the sealing part 124. The upper end of the external member 120 is welded, e.g., thermally welded with the lower end of the first cover 130, and the lower end of the external member 120 is welded, e.g., thermally welded with the upper end of the second cover 140. The first and second covers 130 and 140 are formed of polypropylene, and the inner surface of the external member 120 is formed of modified polypropylene (CPP). Thus, the external member 120 and the first and second covers 130 and 140 are formed of a substantially identical material to secure an effective adhesive condition.

In the current embodiment, a discrete gas chamber may be provided to inject electrolyte to the inside of the external member 120.

Referring to FIG. 5, when an electrode assembly storage space 150 for storing the electrode assembly 110 is disposed inside the external member 120, an extension part 160 is disposed on a side of the sealing part 124 from the electrode assembly storage space 150. Then, a gas chamber 170 is disposed on the extension part 160. In addition, electrolyte injection passages 180 are disposed to connect the electrode assembly storage space 150 to the gas chamber 170. Thus, electrolyte is injected into the electrode assembly storage space 150 through the gas chamber 170 and the electrolyte injection passages 180. As one example, here, an opening may be formed on external member 120 for injecting electrolyte into the electrode assembly storage space 150, and this opening is hermetically sealed after injecting electrolyte. e During charging and discharging, gas generated in the electrode assembly storage space 150 is discharged to the gas chamber 170. When the charging and discharging are completed, the gas chamber 170 and the extension part 160 disposed around the gas chamber 170 are removed, and the sealing part 124 of the external member 120 is heated, compressed, and sealed to complete the fabrication of the battery.

Figure 6:
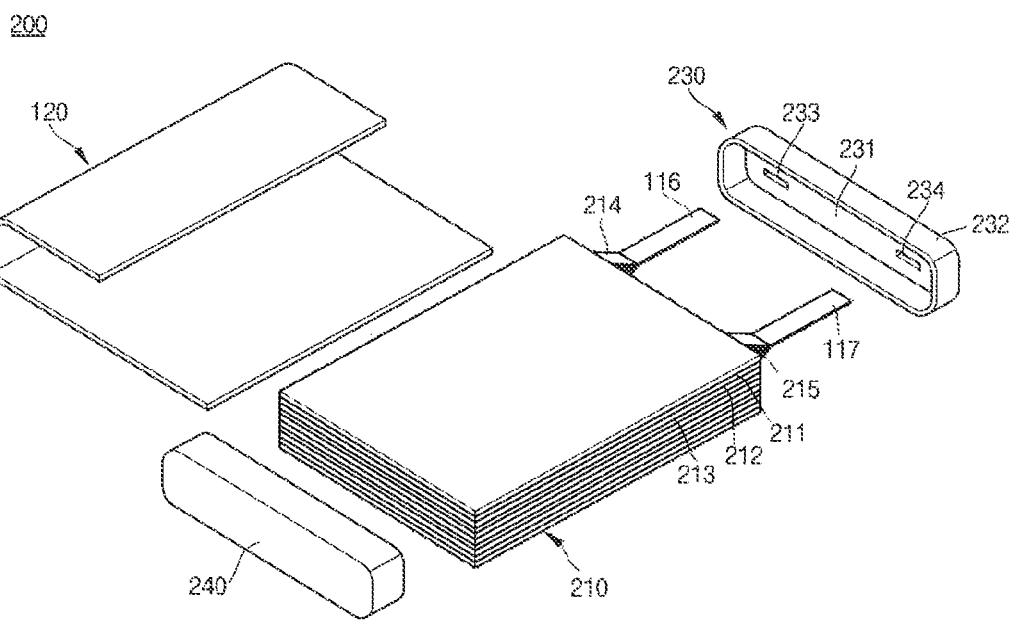
FIG. 6 is an exploded perspective view illustrating a secondary battery according to another embodiment.

FIG. 6 is an exploded perspective view illustrating a secondary battery according to another embodiment.

Referring to FIG. 6, a secondary battery 200 includes an electrode assembly 210 including first electrode plates 211 and second electrode plates 212 to which a plurality of electrode tabs 214 and 215 having different polarities to deliver a current to the outside are respectively attached, and separators 213 disposed between the first and second electrode plates 211 and 212; the external member 120 surrounding the electrode assembly 210; and first and second covers 230 and 240 welded to both ends of the external member 120. The electrode assembly 210 is a stack type electrode assembly formed by sequentially stacking the first electrode plates 211, the separators 213, and the second electrode plates 212. The electrode tabs 214 of the first electrode plates 211 and the electrode tabs 215 of the second electrode plates 212 are attached to the electrode assembly 210 such that they generally extend in a first direction.

The electrode tabs 214 of the first electrode plates 211 are welded to the first electrode terminal 116, and the first electrode terminal 116 extends to the outside through the first cover 230. The electrode tabs 215 of the second electrode plates 212 are welded to the second electrode terminal 117, and the second electrode terminal 117 extends to the outside also through the first cover 230.

As such, the electrode assembly 210 is a stack type electrode assembly, and the electrode tabs 214 and 215 are attached to the electrode assembly 210 in the same direction, so that the first electrode terminal 116 and the second electrode terminal 117 extend through the first cover 230.

The first electrode plates 211 of the electrode assembly 210 are positive electrode plates, and the second electrode plates 212 are negative electrode plates, but the polarity of the first and second electrode plates may be reversed. Since configurations of the positive and negative electrode plates and the separators 213 are substantially the same as those of the previous embodiment, descriptions thereof will be omitted.

In addition, since the external member 120 has substantially the same configuration as that of the previous embodiment, a description thereof will be omitted.

The shapes and materials of the first and second covers 230 and 240 are substantially the same as those of the previous embodiment except that the first cover 230 includes a flat plate 231 and a side plate 232 attached to the flat plate 231. Particularly, the flat plate 231 is provided with a first terminal opening 233 and the second terminal opening 234, and a side plate 232 has no terminal opening.

A method of fabricating the secondary battery 200 configured as described above will now be described.

The positive electrode plates 211, the separators 213, and the negative electrode plates 212 are sequentially stacked to form the stack type electrode assembly 210. Then, the positive electrode tabs 214 and the negative electrode tabs 215 are attached to the positive electrode plates 211 and the negative electrode plates 212 such that they extend in the same direction with respect to the electrode assembly 210.

The upper end of the electrode assembly 210 corresponding to the first direction is coupled with the first cover 230. The first electrode terminal 116 passes through the first terminal opening 233 of the first cover 230, and the second electrode terminal 117 passes through the second terminal opening 234. Thus, the first electrode terminal 116 and the second electrode terminal 117 protrude together through the first cover 230. The first and second electrode terminals 116 and 117 passing through the first and second terminal openings 233 and 234 of the first cover 230 are fixed through a process such as welding. Sealing material may be applied on welded portions of the first and second electrode terminals 116 and 117.

The lower end of the electrode assembly 210 corresponding to a second direction is coupled with the second cover 240.

Then, the external member 120 surrounds the side surface of the electrode assembly 210 and the side surfaces of the first and second covers 230 and 240, and two edges of the external member 120 overlap each other to allow two side surfaces of the external member to be thermally compressed, that is, to be welded through heat welding, so that the sealing part 124 is formed. The upper end of the external member 120 is welded, e.g., thermally welded with the lower end of the first cover 230, and the lower end of the external member 120 is welded, e.g., thermally welded with the upper end of the second cover 240, so as to complete the fabrication of the battery.

Like in the previous embodiment, in the current embodiment, a discrete gas chamber may be provided to inject electrolyte to the inside of the external member 120, and a structure of the gas chamber and a method of fabricating the gas chamber are substantially the same as those of the previous embodiment.

Figure 7:
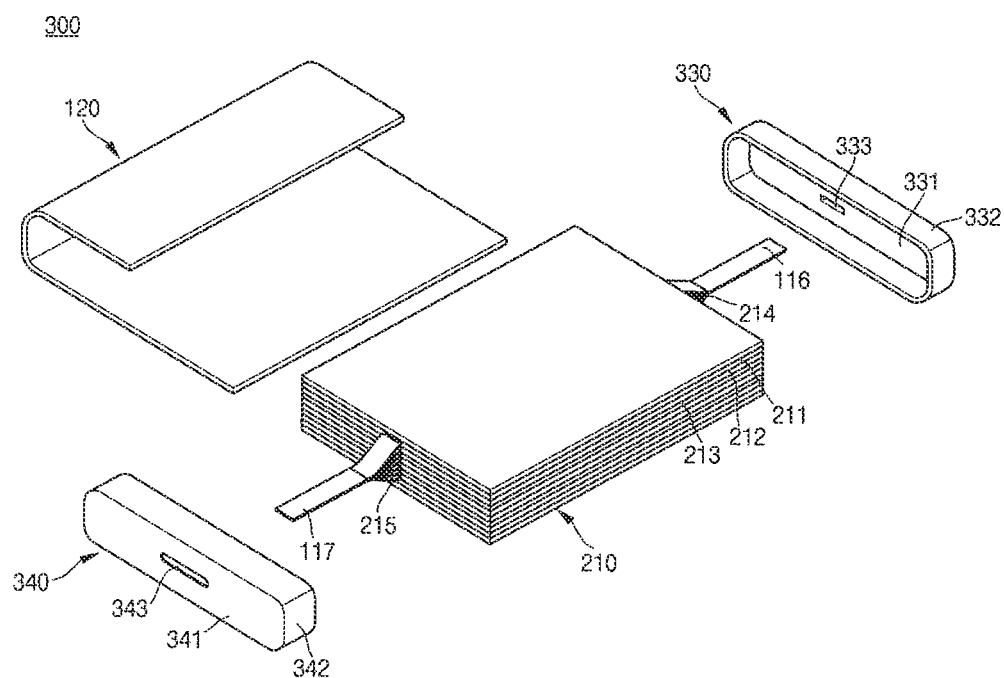
FIG. 7 is an exploded perspective view illustrating a secondary battery according to another embodiment.

FIG. 7 is an exploded perspective view illustrating a secondary battery according to another embodiment.

Referring to FIG. 7, a secondary battery 300 includes the electrode assembly 210 including the first electrode plates 211 and the second electrode plates 212 to which the electrode tabs 214 and 215 having different polarities to deliver a current to the outside are respectively attached, and the separators 213 disposed between the first and second electrode plates 211 and 212; the external member 120 wrapping or surrounding the electrode assembly 210; and first and second covers 330 and 340 each welded to a respective end of the external member 120. The electrode assembly 210 is formed by sequentially stacking the first electrode plates 211, the separators 213, and the second electrode plates 212.

In the current embodiment, the electrode tabs 214 of the first electrode plates 211 and the electrode tabs 215 of the second electrode plates 212 extend in generally opposite directions from the electrode assembly. That is, the electrode tabs 214 of the first electrode plates 211 are attached to the electrode assembly 210 in a first direction, and the electrode tabs 215 of the second electrode plates 212 are attached to the electrode assembly 210 in a second direction opposite to the first direction. The electrode tabs 214 of the first electrode plates 211 is welded to the first electrode terminal 116, and the first electrode terminal 116 extends to the outside through the first cover 330. The electrode tabs 215 of the second electrode plates 212 are welded to the second electrode terminal 117, and the second electrode terminal 117 extends to the outside through the second cover 340.

As such, in the current embodiment, the electrode assembly 210 is a stack type electrode assembly like the embodiment of FIG. 6, except that the extension direction of the first electrode terminal 116 is opposite to the extension direction of the second electrode terminal 117. Thus, the first electrode terminal 116 extends to the outside through the first cover 330, and the second electrode terminal 117 extends to the outside through the second cover 340.

As such, since the electrode assembly 210 is the same as that of the embodiment of FIG. 6, and a configuration of the external member 120 is substantially the same as the embodiment of FIG. 1, descriptions thereof will be omitted.

The shapes and materials of the first and second covers 330 and 340 are substantially the same as those of the embodiment of FIG. 1. That is, the first cover 330 includes a flat plate 331 and a side plate 332 attached to the flat plate 332 and having a terminal opening 333 at about the center of the flat plate 331, and the second cover 340 includes a flat plate 341 and a side plate 342 attached to the flat plate 341 with a terminal opening 343 at about the center of the flat plate 341.

A method of fabricating the secondary battery 300 configured as described above will now be described.

The positive electrode plates 211, the separators 213, and the negative electrode plates 212 are sequentially stacked to form the stack type electrode assembly 210. Then, the positive electrode tabs 214 are attached to the positive electrode plates 211 such that the positive electrode tabs 214 extend generally in the first direction with respect to the electrode assembly 210, and the negative electrode tabs 215 are attached to the negative electrode plate 212 such that the negative electrode tabs 215 extend generally in the second direction with respect to the electrode assembly 210.

The upper end of the electrode assembly 210 corresponding to the first direction is coupled with the first cover 330. The first electrode terminal 116 passes through the terminal opening 333 of the first cover 330, and extends to the outside. The lower end of the electrode assembly 210 corresponding to the second direction is coupled with the second cover 340. The second electrode terminal 117 passes through the terminal opening 343 of the second cover 340, and extends to the outside. Contact portions of the first and second electrode terminals 116 and 117 passing through the first and second covers 330 and 340 are welded, and sealing material is applied to seal the contact portions.

Then, the external member 120 surrounds the side surface of the electrode assembly 210 and the side surfaces of the first and second covers 330 and 340, and both ends of the external member 120 overlap each other to be thermally compressed, that is, to be welded through heat welding, so that the sealing part 124 is formed. The upper end of the external member 120 is welded, e.g., thermally welded with the lower end of the first cover 330, and the lower end of the external member 120 is welded, e.g., thermally welded with the upper end of the second cover 340, like in the previous embodiments.

Like in the embodiment of FIG. 1, in the current embodiment, a discrete gas chamber may be provided to inject electrolyte to the inside of the external member 120, and a structure of the gas chamber and a method of fabricating the gas chamber are substantially the same as those of the embodiment of FIG. 1. Thus, descriptions thereof will be omitted.

Figure 8:
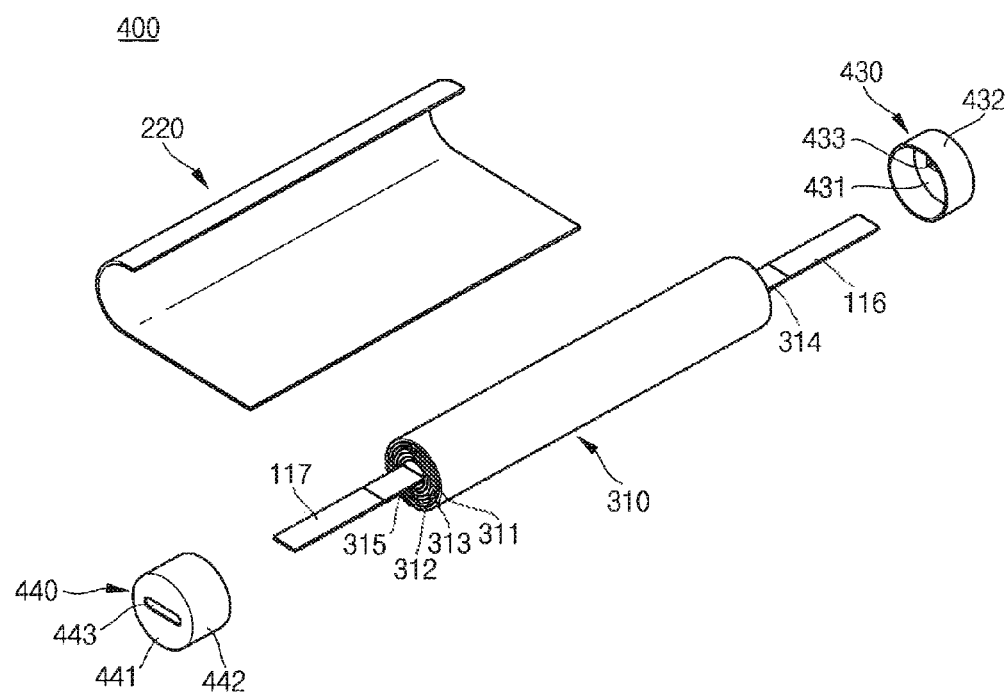
FIG. 8 is an exploded perspective view illustrating a secondary battery according to another embodiment.

FIG. 8 is an exploded perspective view illustrating a secondary battery according to another embodiment.

Referring to FIG. 8, a secondary battery 400 includes an electrode assembly 310 including a first electrode plate 311 and a second electrode plate 312 to which a plurality of electrode tabs 314 and 315 having different polarities to deliver a current to the outside are respectively attached, and a separator 313 disposed between the first and second electrode plates 311 and 312; an external member 220 surrounding the electrode assembly 310; and first and second covers 430 and 440 welded to both ends of the external member 220. The electrode assembly 310 is a cylindrical electrode assembly formed by winding the first electrode plate 311, the separator 313, and the second electrode plate 312 in a circular shape.

In the current embodiment, the electrode tab 314 of the first electrode plate 311 and the electrode tab 315 of the second electrode plate 312 extend in opposite directions. That is, when the electrode tab 314 of the first electrode plate 311 is attached to the electrode assembly 310 in the first direction, the electrode tab 315 of the second electrode plate 312 may be attached to the electrode assembly 310 in the second direction opposite to the first direction. At this point, the electrode tab 314 of the first electrode plate 311 is welded to the first electrode terminal 116, and the first electrode terminal 116 extends to the outside through the first cover 430. In addition, the electrode tab 315 of the second electrode plate 312 is welded to the second electrode terminal 117, and the second electrode terminal 117 extends to the outside through the second cover 440.

As such, the electrode assembly 310 is a cylindrical electrode assembly, and the electrode tabs 314 and 315 are attached to the electrode assembly 310 in the different directions, so that the first and second electrode terminals 116 and 117 respectively extend through the first and second covers 430 and 440.

The first electrode plate 311 of the electrode assembly 310 may be a positive electrode plate, and the second electrode plate 312 may be a negative electrode plate. However, the polarity of the first and second electrode plates may be reversed. Since configurations of the positive electrode plate, the negative electrode plate, and the separator 313 are substantially the same as those of the embodiment of FIG. 1, descriptions thereof will be omitted.

Since an external member 220 is substantially the same as that of the embodiment of FIG. 1 except that the external member 220 surrounds an exterior side surface of the cylindrical electrode assembly 310, a description thereof will be omitted.

The first and second covers 430 and 440 are substantially the same as those of the embodiment of FIG. 1 in properties such as material. However, the first cover 430 includes a flat plate 431 and a side plate 432 attached to the flat plate 431, and the flat plate 431 is provided with a first terminal opening 433 through which the first electrode terminal 116 extends. The flat plate 431 is cylindrical, and the side plate 432 extends from the edge of the flat plate 431.

A method of fabricating the secondary battery 400 configured as described above will now be described.

The positive electrode plate 311, the separator 313, and the negative electrode plate 312 are sequentially arrayed and wound in a cylindrical shape to form the cylindrical electrode assembly 310. Then, the positive electrode tab 314 is provided to the positive electrode plate 311 such that the positive electrode tab 314 extends generally in the first direction with respect to the electrode assembly 310, and the negative electrode tab 315 is attached to the negative electrode plate 312 such that the negative electrode tab 315 extends generally in the second direction with respect to the electrode assembly 310.

The upper end of the electrode assembly 310 corresponding to the first direction is coupled with the first cover 430. The first electrode terminal 116 passes through the terminal opening 433 of the first cover 430, and extends to the outside. The lower end of the electrode assembly 310 corresponding to the second direction is coupled with the second cover 440. The second electrode terminal 117 passes through the terminal opening 443 of the second cover 440, and extends to the outside. Contact portions of the first and second electrode terminals 116 and 117 passing through the first and second covers 430 and 440 are welded, and sealing material is applied to seal the contact portions.

Then, the external member 220 wraps around or surrounds the side surface of the electrode assembly 310 and the side surfaces of the first and second covers 430 and 440, and two edges of the external member 420 overlap each other to allow two side surface of the external member 420 to be thermally compressed, that is, to be welded through heat welding, so that a sealing part is formed. The upper end of the external member 220 is welded, e.g., thermally welded with the lower end of the first cover 430, and the lower end of the external member 220 is welded, e.g., thermally welded with the upper end of the second cover 440, like in the previous embodiments.

Like in the embodiment of FIG. 1, in the current embodiment, a discrete gas chamber may be provided to inject electrolyte to the inside of the external member 220, and a structure of the gas chamber and a method of fabricating the gas chamber are substantially the same as those of the embodiment of FIG. 1. Thus, descriptions thereof will be omitted.

According to the embodiment, a sealing part (also called a terrace part) in which a circuit board provided with a protective circuit is installed, or in which an electrode tab is disposed by opening a surface of a pouch type external member of a related art secondary battery is not required. Thus, an additional space of an external case is not required to accommodate the sealing part, and therefore, the capacity of the battery is increased.

According to an embodiment, the cap-shaped covers or the plate-shaped covers are welded to the upper and lower ends of the external case, and the electrode terminals of the electrode assembly extend through the covers. Thus, the space between the electrode terminals and the covers is sealed through welding or sealing liquid, so as to simplify a sealing process and improve sealing conditions.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
an electrode assembly comprising a first electrode plate, a second electrode plate, and a separator between the first electrode plate and the second electrode plate;
a first electrode terminal electrically coupled to the first electrode plate by a first electrode tab and a second electrode terminal electrically coupled to the second electrode plate by a second electrode tab;
an external member wrapped around side surfaces of the electrode assembly; and
a first cover and a second cover directly coupled to the external member and to the electrode assembly and covering a first end surface and a second end surface, respectively, of the electrode assembly, at least one of the first cover and the second cover having a cap shape having a cavity defined by a side plate and an end plate such that there is a gap entirely between a portion of the end plate and a portion of the electrode assembly,
wherein the first cover and the second cover protrude from the external member;
wherein the first electrode terminal and the second electrode terminal protrude from at least one of the first and second covers; and
wherein the external member is wrapped around side surfaces of the first and second covers.

2. The secondary battery as claimed in claim 1, wherein the first electrode terminal protrudes from the first cover and the second electrode terminal protrudes from the second cover.

3. The secondary battery as claimed in claim 1, wherein the first electrode terminal and the second electrode terminal protrude from the first cover.

4. The secondary battery as claimed in claim 1, wherein the external member has a first surface and a second surface overlapping and welded together to form a sealing part.

5. The secondary battery as claimed in claim 1, wherein the first cover and the second cover are welded to the external member.

6. The secondary battery as claimed in claim 1, wherein the external member comprises a gas chamber to which gas generated during charging and discharging of the secondary battery is discharged, and wherein the gas chamber is configured to inject electrolyte into the secondary battery.

7. The secondary battery as claimed in claim 1, wherein the external member comprises a laminate film having a rectangular sheet shape.

8. The secondary battery as claimed in claim 1, wherein the external member has a thickness between about 170 μm and about 300 μm.

9. The secondary battery as claimed in claim 1, wherein the external member comprises an outer layer, a shield layer, and an inner layer stacked together.

10. The secondary battery as claimed in claim 1, wherein at least one of the first cover and the second cover has an electrode tab storage space.

11. The secondary battery as claimed in claim 1, wherein the first cover has a terminal opening through which the first electrode terminal protrudes, and the second cover has a terminal opening through which the second electrode terminal protrudes.

12. The secondary battery as claimed in claim 11, wherein the first electrode terminal is welded to the first cover at the first terminal opening and the second electrode terminal is welded to the second cover at the second terminal opening.

13. The secondary battery as claimed in claim 1, wherein the first cover has a first terminal opening and a second terminal opening through which the first electrode terminal and the second electrode terminal, respectively, protrude.

14. The secondary battery as claimed in claim 13, wherein the first electrode terminal and the second electrode terminal are welded to the first cover at the first terminal opening and at the second terminal opening, respectively.

15. The secondary battery as claimed in claim 1, wherein the first cover and the second cover comprise polypropylene or polyethylene.

16. The secondary battery as claimed in claim 1, wherein the electrode assembly is a stack electrode assembly in which the first electrode plate, the separator, and the second electrode plate are sequentially stacked.

17. The secondary battery as claimed in claim 1, wherein the electrode assembly is a jelly roll electrode assembly in which the first electrode plate, the separator, and the second electrode plate are wound together and compressed.

18. The secondary battery as claimed in claim 1, wherein the electrode assembly is a cylindrical electrode assembly in which the first electrode plate, the separator, and the second electrode plate are wound in a cylindrical shape.

* * * * *